June 15, 1943.  R. P. LEWIS  2,322,149
TUBULAR AXLE DRIVE
Filed Jan. 6, 1941
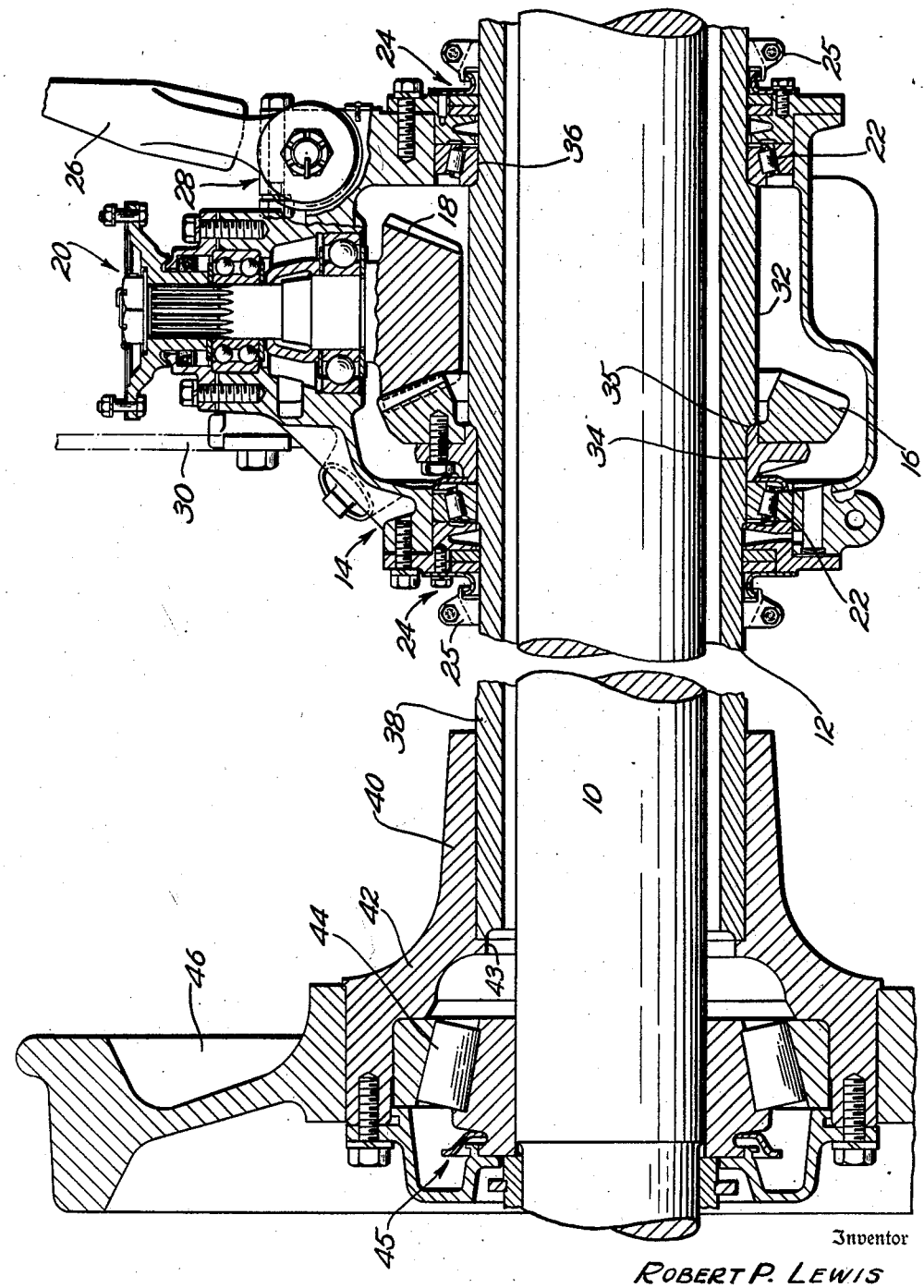
Inventor
ROBERT P. LEWIS
By Lawrence C. Witker
Attorney Patented June 15, 1943

2,322,149

UNITED STATES PATENT OFFICE 2,322,149

TUBULAR AXLE DRIVE

Robert P. Lewis, Toledo, Ohio, assignor to Spicer Manufacturing Corporation, Toledo, Ohio, a corporation of Virginia Application January 6, 1941, Serial No. 373,244

1 Claim. (Cl. 105—117)

This invention relates to axle drives of the type wherein a gear casing surrounds a rail car axle, and contains gearing to be driven by rotation of the axle to thereby drive a propeller shaft.

An object of the invention is to provide an axle with means to positively and directly drive the gearing in the gear casing.

Another object of the invention is to provide a combined inner and outer axle mechanism with drive means of the above type.

A further object of the invention is to provide an axle drive with a combined driving quill and tubular axle, which surrounds an inner auxiliary axle.

A still further object is to provide an axle mechanism with means for mounting the car wheels at the extremities thereof while permitting the use of a comparatively small, compact driving gear mechanism.

Still another object is to provide an axle drive with a tubular axle upon which may be removably supported the gear mechanism as well as the car wheels.

In a prior Patent No. 2,026,076, issued December 31, 1935, there is disclosed a one-piece sleeve surrounding the central part of a tapered standard axle and driven by the latter through means of rubber bushings positioned in the spaces between the ends of the sleeve and the adjacent portions of the axle. Although such a construction affords very good results, a number of car axles comprise an inner solid or tubular axle and an outer tubular axle provided at its extremities with flanged hub portions, between which hubs and the inner axle are positioned anti-friction bearings, and upon which hubs are mounted the car wheels.

It is, therefore, another major object of the present invention to provide improvements in the structure and operation of the invention disclosed in said patent.

Further objects and advantages will become apparent from a study of the following description when taken in connection with the accompanying drawing, in which the figure is a fragmentary, longitudinal sectional view through a preferred form of the invention.

The illustrated embodiment of the invention comprises an axle shaft 10, which may either be solid, as illustrated, or tubular, and which is surrounded by a tubular axle 12, a housing assembly 14 in which the tubular axle 12 is rotatably mounted, and a set of gearing disposed within the housing assembly and normally driven by the tubular axle. The means for mounting the gearing upon the tubular axle and for drivingly connecting it therewith, as well as the means for mounting the car wheels on the ends of the tubular axle, comprise the more important subject matter of the present invention, and will be fully described later.

The casing proper may either be of one or two part construction. Within this housing there is provided a bevel gear 16 in mesh with a pinion 18, the gear 16 being of one-piece, and the pinion being carried by a power take-off shaft and coupling assembly 20 that is adapted to transmit power to a generator or the like. The tubular axle is journalled in the ends of the casing assembly by means of anti-friction bearings 22, the races of which are of one-piece construction, and these bearings are retained and sealed by a pair of retaining and sealing assemblies 24. Removable abutments in the form of split clamp members 25 embrace the axle 12 adjacent the assemblies 24 to locate the latter and cooperate to prevent the ingress of foreign matter.

For the purpose of preventing driving torque reactions from rotating the casing assembly relative to the tubular axle, a torque arm 26 is provided for connection to the rail car truck frame and having a connection with the housing assembly through a joint indicated generally at 28, designed to permit lateral or axial movement of the housing assembly while preventing rotation thereof. On the opposite side of the casing assembly is provided a safety arm 30, designed and arranged to engage the car truck rail in the event of damage to or failure of the torque arm.

The tubular axle 12 is preferably of one-piece construction of larger diameter than the inner axle shaft 10 so that regardless of variation in axle diameter, the latter can be telescoped within the tubular axle. The tubular axle is of varying outside diameter, the largest diameter being at 32, which is arranged to be located within the casing assembly. Adjacent portion 32 is a portion 34 of slightly reduced diameter to provide an abutment at 35 for locating the ring gear 16. Other reduced diameter portions at 36 receive and locate the inner races of the anti-friction bearings 22. The remaining portions of the tubular axle may be of constant diameter except that, if desired, the extremities thereof may be slightly enlarged at 38 to receive the hub extensions 40 of wheel supporting hubs 42.

From the foregoing, it is to be noted that the different diameters of axle 12 are arranged to enhance the assembly of the several elements, that the ring gear, bearing races and wheel hubs are adapted to be pressed onto their respective shaft portions, and that no extraneous securing means are utilized. Furthermore, such arrangement permits the gearing and gear casing to be assembled on the tubular axle prior to assembly therewith of the wheel hubs 42. By such means, a considerably smaller driving unit may be utilized and numerous parts eliminated, as will be readily understood.

The wheel hub 42 is preferably formed with an internal flange 43 to locate the hub with respect to the axle 12. The interior of the hub is arranged to receive the outer race of an antifriction bearing 44, the inner race thereof being positioned on the exterior of the axle shaft 10 in any suitable manner. Lubricating and lubricant retaining means, indicated generally at 45, may be utilized adjacent bearing 44 to insure proper lubrication thereof. On the exterior of the hub is mounted the car wheel 46. The wheel and bearing structures per se form no part of the present invention, and, therefore, the arrangement shown is illustrative of any suitable wheel mounting of similar or equivalent type.

Thus, by the present invention I have combined the so-called driving quill of the prior patent, above referred to, with a tubular axle, and by so doing have eliminated the use of resilient members to form a driving connection between the quill and axle, and provided a positive, rigid driving connection between the axle and gearing. Furthermore, the wheel hubs are arranged to be pressed on to the tubular axle after assembly of the gearing and gear casing with the tubular axle to permit ready assembly of the complete driving axle mechanism.

Numerous changes and variations may be made that would be obvious to those skilled in the art. The invention may be embodied in other specific forms without departing from the spirit or essential characteristics thereof. The present embodiment is, therefore, to be considered in all respects as illustrative and not restrictive, the scope of the invention being indicated by the appended claim rather than the foregoing description, and all changes which come within the meaning and range of equivalency of the claim are, therefore, intended to be embraced therein.

What I claim is:

In a rail car axle drive, a tubular axle, a substantially relatively stationary gear casing surrounding said tubular axle, bearings between said casing and axle, gearing in said casing comprising a ring gear pressed onto said tubular axle and a pinion gear in mesh with said ring gear, said tubular axle having a stepped outside diameter providing means for locating said ring gear with respect to said pinion gear, said means including spaced shoulders for positioning said casing with respect to said axle and for positioning said ring gear with respect to said casing and said axle, said ring gear forming an abutment for one of said bearings and one of said shoulders forming an abutment for another of said bearings, and sealing means between said casing and said axle outwardly of said bearings.

ROBERT P. LEWIS.